United States Patent
Karn et al.

(10) Patent No.: US 10,810,243 B2
(45) Date of Patent: Oct. 20, 2020

(54) SYSTEM AND METHOD FOR GENERATING ABSTRACTIVE SUMMARIES OF INTERLEAVED TEXTS

(71) Applicant: FUJI XEROX CO., LTD., Tokyo (JP)

(72) Inventors: Sanjeev Kumar Karn, Munich (DE); Francine Chen, Menlo Park, CA (US); Yin-Ying Chen, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/397,867

(22) Filed: Apr. 29, 2019

(65) Prior Publication Data

US 2020/0285663 A1   Sep. 10, 2020

Related U.S. Application Data

(60) Provisional application No. 62/815,899, filed on Mar. 8, 2019.

(51) Int. Cl.
*G06F 16/34* (2019.01)
*G06N 3/04* (2006.01)
*G06N 3/08* (2006.01)
*G06F 40/20* (2020.01)

(52) U.S. Cl.
CPC ............ *G06F 16/345* (2019.01); *G06F 40/20* (2020.01); *G06N 3/0445* (2013.01); *G06N 3/08* (2013.01)

(58) Field of Classification Search
CPC .............................. G06F 13/345; G06F 40/20
See application file for complete search history.

(56) References Cited

U.S. PATENT DOCUMENTS

| | | | |
|---|---|---|---|
| 10,467,630 B2* | 11/2019 | Iyer | G06Q 10/10 |
| 2013/0006973 A1* | 1/2013 | Caldwell | G06F 16/345 707/723 |
| 2017/0124034 A1* | 5/2017 | Upadhyay | G06Q 10/107 |
| 2018/0239495 A1* | 8/2018 | Sharifi | H04L 67/306 |
| 2018/0336207 A1* | 11/2018 | Dunne | G06F 16/35 |
| 2019/0121852 A1* | 4/2019 | Applegate | G06F 40/284 |
| 2019/0121868 A1* | 4/2019 | Dunne | G06K 9/6221 |
| 2019/0121907 A1* | 4/2019 | Brunn | G06F 16/353 |

(Continued)

OTHER PUBLICATIONS

Dernoncourt, F. et al. "Pubmed 200k RCT: a Dataset for Sequential Sentence Classification in Medical Abstracts" In Proceedings of the Eighth International Joint Conference on Natural Language Processing, 2017, pp. 308-313. Asian Federation of Natural Language Processing, 6 pages.

(Continued)

*Primary Examiner* — Asher D Kells
(74) *Attorney, Agent, or Firm* — Procopio, Cory, Hargreaves & Savitch LLP (57) ABSTRACT

A method and system for generating summaries of posts of interleaved text are provided. The method includes embedding, by a first neural network, each post through word-to-word encoding; embedding, by a second neural network, overall content of the plurality of posts through post-to-post encoding based on the word-to-word encoding of each post; generating, by at least a third neural network, a summary of the at least one thread through word-to-word decoding based on the overall content embedding of the plurality of posts; and displaying the summary of the at least one thread to a user.

20 Claims, 8 Drawing Sheets

(56) References Cited

U.S. PATENT DOCUMENTS

2019/0205462 A1* 7/2019 Zhao .............. G06F 16/9038
2019/0205464 A1* 7/2019 Zhao .............. G06F 16/3334
2019/0205743 A1* 7/2019 Jiang .............. G06N 3/0445
2019/0258661 A1* 8/2019 Dunne ............. G06F 16/285
2020/0026767 A1* 1/2020 Chen .............. G06F 16/334

OTHER PUBLICATIONS

Hsu, W. et al. "A Unified Model for Extractive and Abstractive Summarization using Inconsistency Loss" In Proceedings of the 56th Annual Meeting of the Association for Computational Linguistics, Jul. 15-20, 2018, pp. 132-141 (vol. 1: Long Papers), Melbourne, Australia, 10 pages.

Jiang, J. et al. "Learning to Disentangle Interleaved Conversational Threads with a Siamese Hierarchical Network and Similarity Ranking" In Proceedings of the 2018 Conference of the North American Chapter of the Association for Computational Linguistics: Human Language Technologies, Jun. 1-6, 2018, pp. 1812-1822, vol. 1 (Long Papers), 11 pages.

Jing, B. et al. "On the Automatic Generation of Medical Imaging Reports" In Proceedings of the 56th Annual Meeting of the Association for Computational Linguistics, Jul. 15-20, 2018, pp. 2577-2586, (vol. 1: Long Papers),10 pages.

Krause, J. et al. "A Hierarchical Approach for Generating Descriptive Image Paragraphs" In Computer Vision and Pattern Recognition (CVPR), 2017; 9 pages.

Li, J. et al. "A Hierarchical Neural Autoencoder for Paragraphs and Documents" In Proceedings of the 53rd Annual Meeting of the Association for Computational Linguistics and the 7th International Joint Conference on Natural Language Processing, 2015, pp. 1106-1115, (vol. 1: Long Papers), 10 pages.

Nallapati, R. et al. "SummaRuNNer: A Recurrent Neural Network Based Sequence Model for Extractive Summarization of Documents" In AAAI Conference on Artificial Intelligence, 2017, 7 pages.

Shang, G. et al. "Unsupervised Abstractive Meeting Summarization with Multi-Sentence Compression and Budgeted Submodular Maximization" In Proceedings of the 56th Annual Meeting of the Association for Computational Linguistics, 2018, pp. 664-674, (vol. 1: Long Papers) 15 pages.

Wang, L. et al. "Context-based Message Expansion for Disentanglement of Interleaved Text Conversations" Human Language Technologies: The 2009 Annual Conference of the North American Chapter of the ACL, Jun. 2009, pp. 200-208 (9 pages).

Xue, Y. et al. "Multimodal Recurrent Model with Attention for Automated Radiology Report Generation" In MICCAI 2018: Medical Image Computing and Computer Assisted Intervention—21st International Conference, Granada, Spain, Sep. 16-20, 2018, pp. 457-466, 10 pages.

* cited by examiner

FIG. 1

INPUT

- 215: John bought a red car in Baltimore yesterday. 250
- 220: you mean he's not going to buy my car? :( 250
- 225: So that's why John missed the poker game. 255
- 230: Did he visit my Aunt Minnie too? 260
- 235: That was my money he used. :( 250
- 240: If I have to put up with another red thing around here, I'll die 250
- 245: He was supposed to go today, he probably didn't paint the house after all. 260

SUMMARIZATION SYSTEM

OUTPUT

- 265: John betrayed his friends and bought a red car. 250
- 270: John missed the poker game yesterday. 255
- 275: John didn't visit and paint aunt Minnie 260 house in Baltimore.

SYSTEM AND METHOD FOR GENERATING ABSTRACTIVE SUMMARIES OF INTERLEAVED TEXTS

CROSS-REFERENCE TO RELATED APPLICATIONS

This application claims benefit of priority from Provisional U.S. Patent application Ser. No. 62/815,899, filed Mar. 8, 2019, the contents of which are incorporated by reference.

BACKGROUND

Field

The present disclosure relates to electronic communication systems, and more specifically, to systems and methods of automatically generating textual summaries of interleaved conversations in electronic communication systems.

Related Art

Interleaved texts are becoming more common with new ways of working and new forms of communication, starting with multi-author entries for activity reports, and later for meeting texts and social media conversations. In these types of multi-participant postings, (e.g., online chat conversations or social media posting boards), several conversations or topic threads may be occurring concurrently. These multiple threads may make it difficult for readers reviewing the postings to not only follow ongoing discussions but also identify the essence of the different threads. Related art systems may use a two-step process to automatically summarize different threads.

First, a disentanglement process may be used on the interleaved posts. The disentanglement process may then be followed by a summarization process for each thread. For example some related art processes use a sentence compression method that compresses the threads into single sentence summaries. However, a major disadvantage with this two-step process is that the disentanglement obtained through related art methods using either supervised or unsupervised disentanglement introduce errors that are then propagated to the downstream summarization task, degrading the overall performance of the related art process. Example implementations of the present application may seek to address this problem.

SUMMARY OF THE DISCLOSURE

Aspects of the present application may include a method for generating summaries of posts of interleaved text. The method may include embedding, by a first neural network, each post through word-to-word encoding; embedding, by a second neural network, overall content of the plurality of posts through post-to-post encoding based on the word-to-word encoding of each post; generating, by at least a third neural network, a summary of the at least one thread through word-to-word decoding based on the overall content embedding of the plurality of posts; and displaying the summary of the at least one thread to a user.

Additional aspects of the present application may include a non-transitory computer readable medium encoded with instructions for making a computing device execute a method of automatically summarizing posts of interleaved text. The method may include embedding, by a first neural network, each post through word-to-word encoding; embedding, by a second neural network, overall content of the plurality of posts through post-to-post encoding based on the word-to-word encoding of each post; generating, by at least a third neural network, a summary of the at least one thread through word-to-word decoding based on the overall content embedding of the plurality of posts; and displaying the summary of the at least one thread to a user.

Further aspects of the present application may include a computing device having a storage device and a processor. The storage device may store a plurality of posts from a conversation platform. The processor may execute a method of automatically summarizing posts of interleaved text. The method may include embedding, by a first neural network, each post through word-to-word encoding; embedding, by a second neural network, overall content of the plurality of posts through post-to-post encoding based on the word-to-word encoding of each post; generating, by at least a third neural network, a summary of the at least one thread through word-to-word decoding based on the overall content embedding of the plurality of posts; and displaying the summary of the at least one thread to a user.

Further aspects of the present application may include a computing device having a storage means for storing a plurality of posts of interleaved text, means for embedding each post through word-to-word encoding, means for embedding overall content of the plurality of posts through post-to-post encoding based on the word-to-word encoding of each post, means for generating a summary of the at least one thread through word-to-word decoding based on the overall content embedding of the plurality of posts, and means for displaying the summary of the at least one thread to a user.

DETAILED DESCRIPTION

The following detailed description provides further details of the figures and example implementations of the present application. Reference numerals and descriptions of redundant elements between figures are omitted for clarity.

Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

In the present application, the terms computer readable medium may include a local storage device, a cloud-based storage device, a remotely located server, or any other storage device that may be apparent to a person of ordinary skill in the art.

Figure 1:
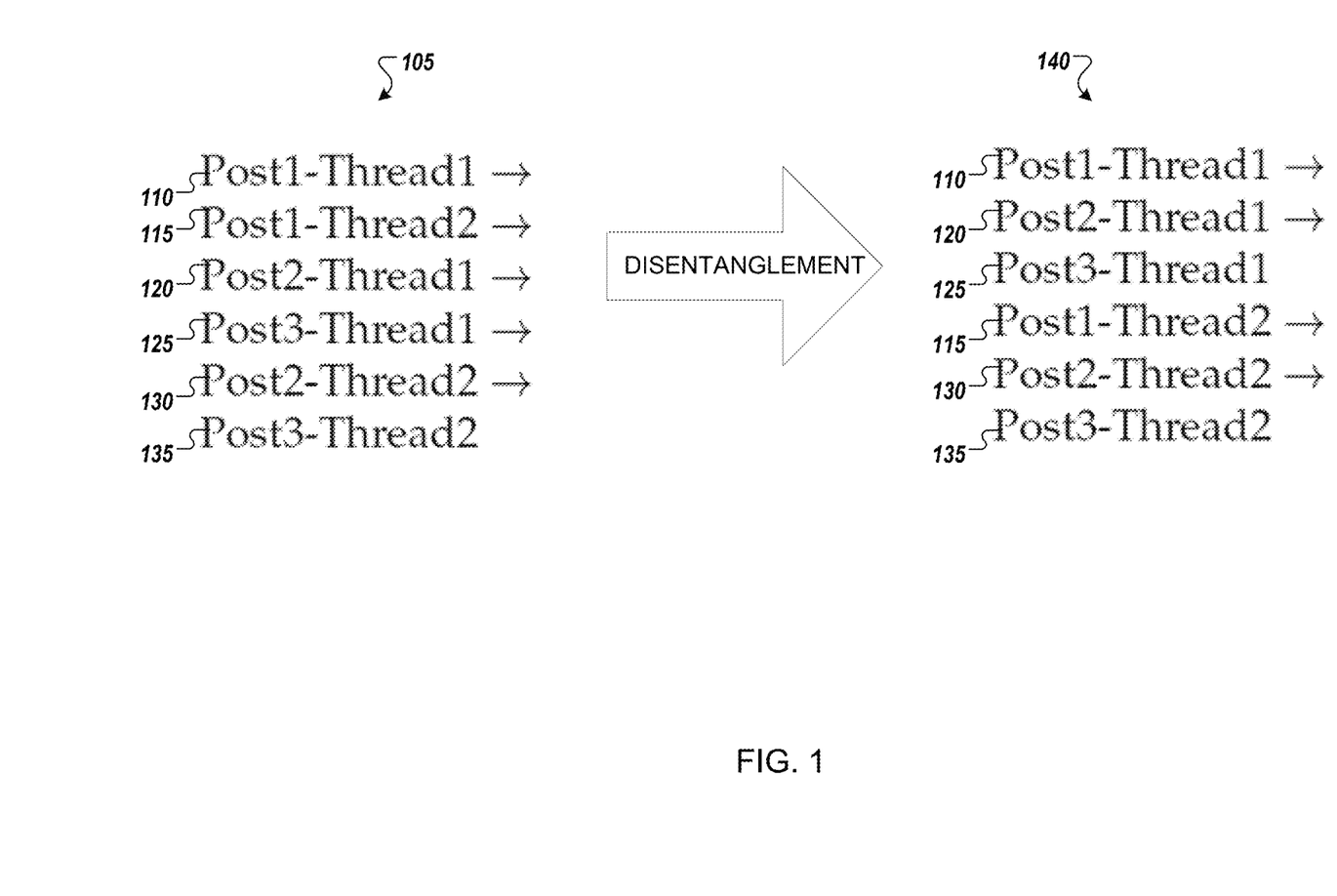
FIG. 1 illustrates an example of interleaved threads before and after a disentanglement process.

As discussed above, interleaved texts are becoming more common with new ways of working and new forms of communication, including multi-author entries for activity reports, meeting texts, and social media conversations. It can often be difficult to quickly get a sense of or following the content of different threads in interleaved texts, where posts belonging to different threads occur in a single sequence. In order to address this, related art systems first disentangle the interleaved messages and then summarize the separate threads. FIG. 1 illustrates an example of these interleaved threads before and after the disentanglement process. As illustrated, the interleaved messages 105 includes 6 intermingled posts (110-135) forming two separate threads, each consisting of three posts. Thread 1 includes posts 110, 120 and 125. Thread 2 includes posts 115, 130, and 135. This intermingling leads to difficulties in users being unable to not only following discussions but also determine the essence of the threads.

In the disentangled conversation 140 of FIG. 1, the interleaved posts 110-135 have been grouped together based on their threads. Specifically, posts 110, 120, and 125 of thread 1 have been grouped together and posts 115, 130, 135 of thread 2 have been grouped together.

After the intermingled threads are disentangled, the related art process may provide a summary of the topic threads, but the disentanglement process introduces errors that can be propagated to the summarization step, degrading the overall performance.

To address this, some example implementations of the present application may provide an end-to-end trainable encoder-decoder system that takes a variable length input, (e.g., interleaved texts), processes it and generates a variable length output, (e.g., a multi-sentence summary; see FIG. 2 discussed below for an illustration). In some example implementations, an end-to-end system may eliminate the disentanglement component, and thus, the error propagation.

Additionally, in some example in some example implementations, the interleaved posts may be encoded hierarchically, (e.g., word-to-word (words in a post) followed by post-to-post (posts in a channel)). Further, in some example implementations, the decoder may also generates summaries hierarchically, (e.g., thread-to-thread (generate thread representations) followed by word-to-word (e.g., generate summary words). Additionally, in some example implementations, a hierarchical attention mechanism (discussed in greater detail below with respect to FIG. 5 below) for interleaved text may be used. As discussed herein, some example implementations of an end-to-end trainable hierarchical framework may enhances performance over a sequence to sequence framework by 8% on a synthetic interleaved texts dataset As described herein, example implementations of the present application may include a text encoder instead of an image encoder. Further, in some example implementations, a thread LSTM may be used to generate thread representations, rather than topics from an input set of image regions. Further, in some example implementations, a feedback LSTM may be trained to generate non-redundant summaries of different threads, rather than generating a coherent paragraph. Further, in some example implementations, a hierarchical attention model may be used to identify important concepts to be summarized. Further, in some example implementations, training may be done using an end-to-end system instead of a multi-step process.

Additionally, in some example implementations, a model encoder may try to encode the input text into an embedding space and the model decoder may try to generate the input text given the embedded representation so that there is no summarization or detangling involved. Additionally, in some example implementations, sentence-level attentions may only be calculated when decoding new sentences.

Further, in some example implementations, attention networks may be trained as part of an end-to-end abstractive summarization system. Further, in some example implementations, the attention model may be trained end-to end on regularly labeled data, instead of training attention parameters and other parameters on different training data.

Figure 2:
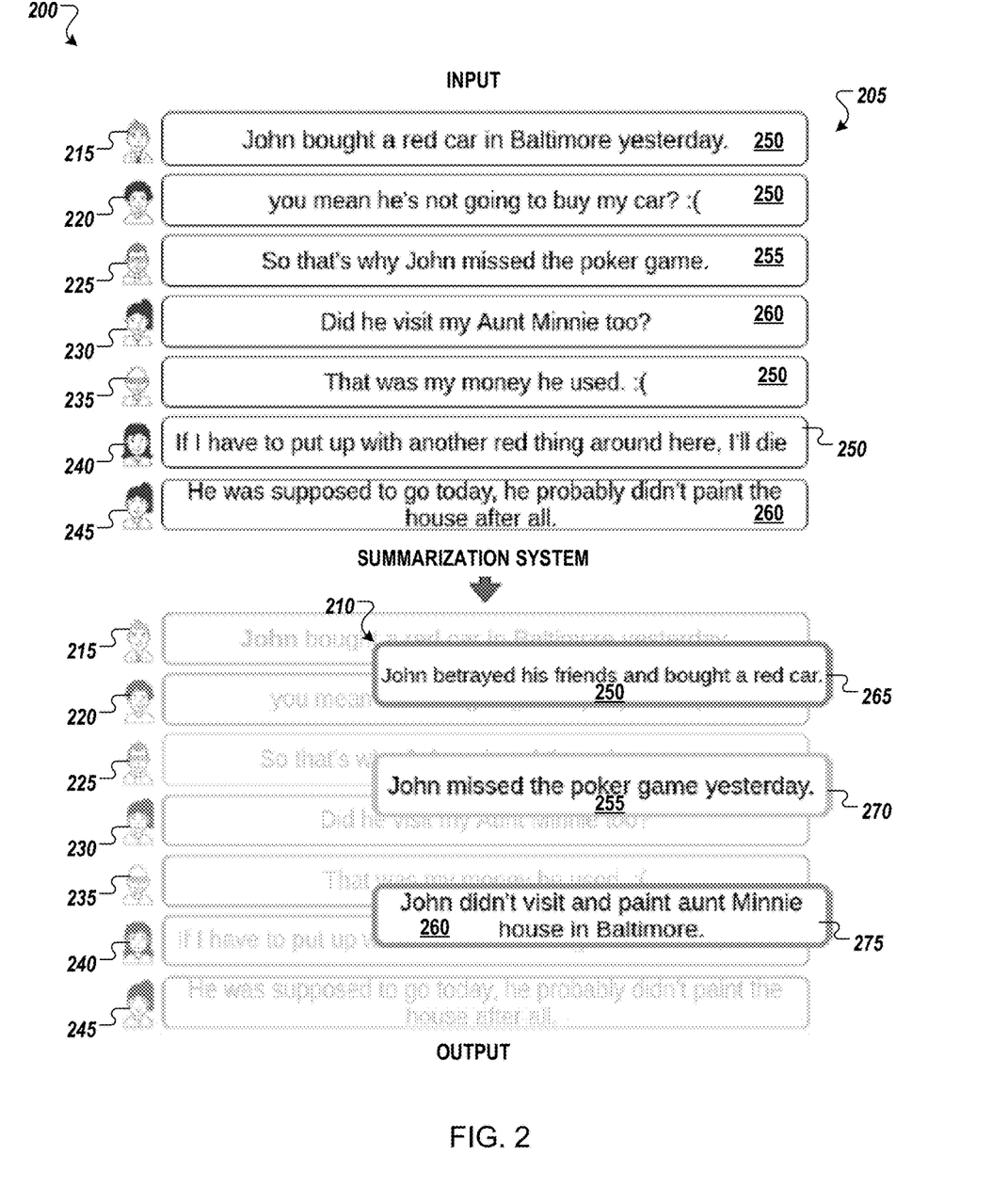
FIG. 2 illustrates a graphic representation of processing conversational input analyzed by a system in accordance with example implementations of the present application, and sentence summary output that may be generated by the system.

FIG. 2 illustrates a graphic representation 200 showing processing conversational input 205 that may be analyzed by a system in accordance with example implementations of the present application, and sentence summary output that may be generated by the system. As illustrated the conversational input 205 includes a series of interleaved posts 215-245 from a conversation platform such as a group messaging platform or a social media platform. Reference numerals 250, 255 and 260 have been provide to identify three different conversational threads represented in the posts 215-245. The summarization system takes the conversational posts 215-245 as input and outputs three 1-sentence summaries 265, 270, 275 representative of the three different conversational threads represented by reference numerals 250-260. FIG. 2 illustrates that the summaries 265-275 are generated without disentangling the posts 215-245

Figure 3:
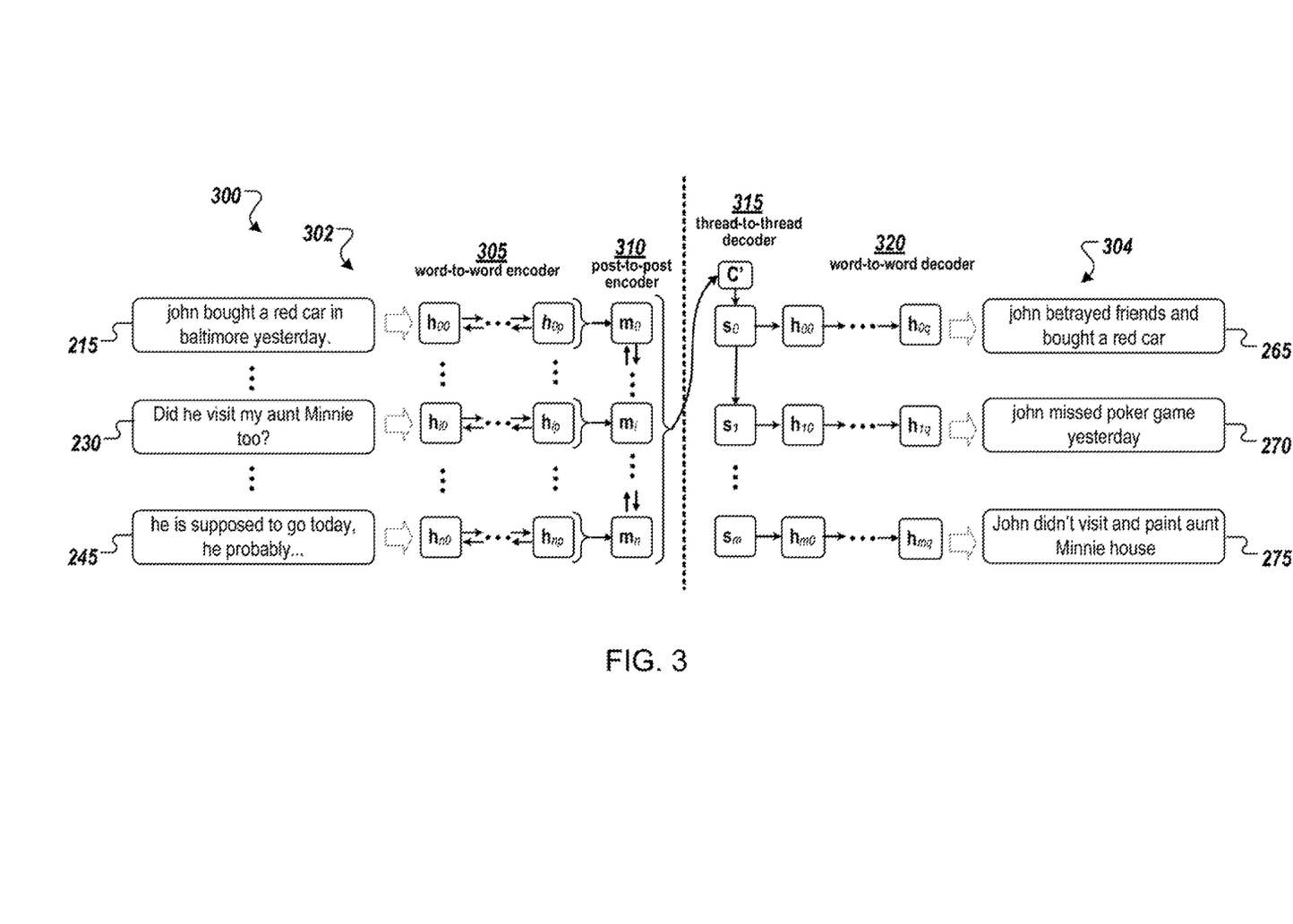
FIG. 3 illustrates a conceptual schematic of a hierarchical encoder-decoder architecture in accordance with example implementations of the present application.

FIG. 3 illustrates a conceptual schematic of a hierarchical encoder-decoder architecture 300 in accordance with example implementations of the present application. The architecture may be implemented using one or more neural networks including one or more computing devices such as computing device 805 illustrated in FIG. 8 discussed below. As illustrated, the encoder side 302 of the architecture includes first, a low-level, word-to-word encoder 305 that converts a sequence words in a post, Pj (215-245 from FIG. 2), to a sequence of representations, $H_j = \langle h_{j0}, \ldots, hj_{|Pj|}\rangle$. Subsequently, a top-level, post-to-post encoder 310 converts those representations, $\langle H_0, \ldots, H_{|C|}\rangle$ to a sequence of top-level post representations, $\langle m_1, \ldots, m_{|C|}\rangle$. These encoded representations are then passed to the decoder 304, which utilizes a top-level, thread-to-thread, decoder to disentangle them into a sequence of thread representations, $\langle s_1, \ldots, s_{|T|}\rangle$. In some example implementations, the thread-to-thread decoder may be a unidirectional LSTM ($f^{Dr2t}$) with initial state $h_0^{Dr2t}$ set with a feedforward-mapped conversation vector C'. Finally, a low-level, word-to-word, decoder takes each thread representation $s_i$ and generates a sequence of summary words (265-275 from FIG. 2).

The maximum number of posts in the interleaved texts is denoted by n and threads by m. In some example implementations, the number of words in posts may be limited and summaries limited to fixed lengths by either truncating or padding, and denote them by p and q respectively. Further, the hidden states of the encoder and decoder may have dimensionality l.

In some example implementations, the word-to-word encoder 305 and the posts-to-post encoder 310 may be Long Short-term Memory (LSTM) Neural Networks. Further, some example implementations may use threadLSTM network, which uses a top-level recurrent neural network decoder that keeps track of its regions to generate new topics, for the decoder 304. Other example implementations may use a feedbackLSTM, which a uses top-level decoder which takes feedback from the low-level decoder to generate a new topic, for the decoder 304.

As discussed below, some example implementations may use hierarchical attention with attentions only being computed when decoding new sentences. Additionally, in some example implementations, the attention networks may be trained end-to-end.

Figure 4:
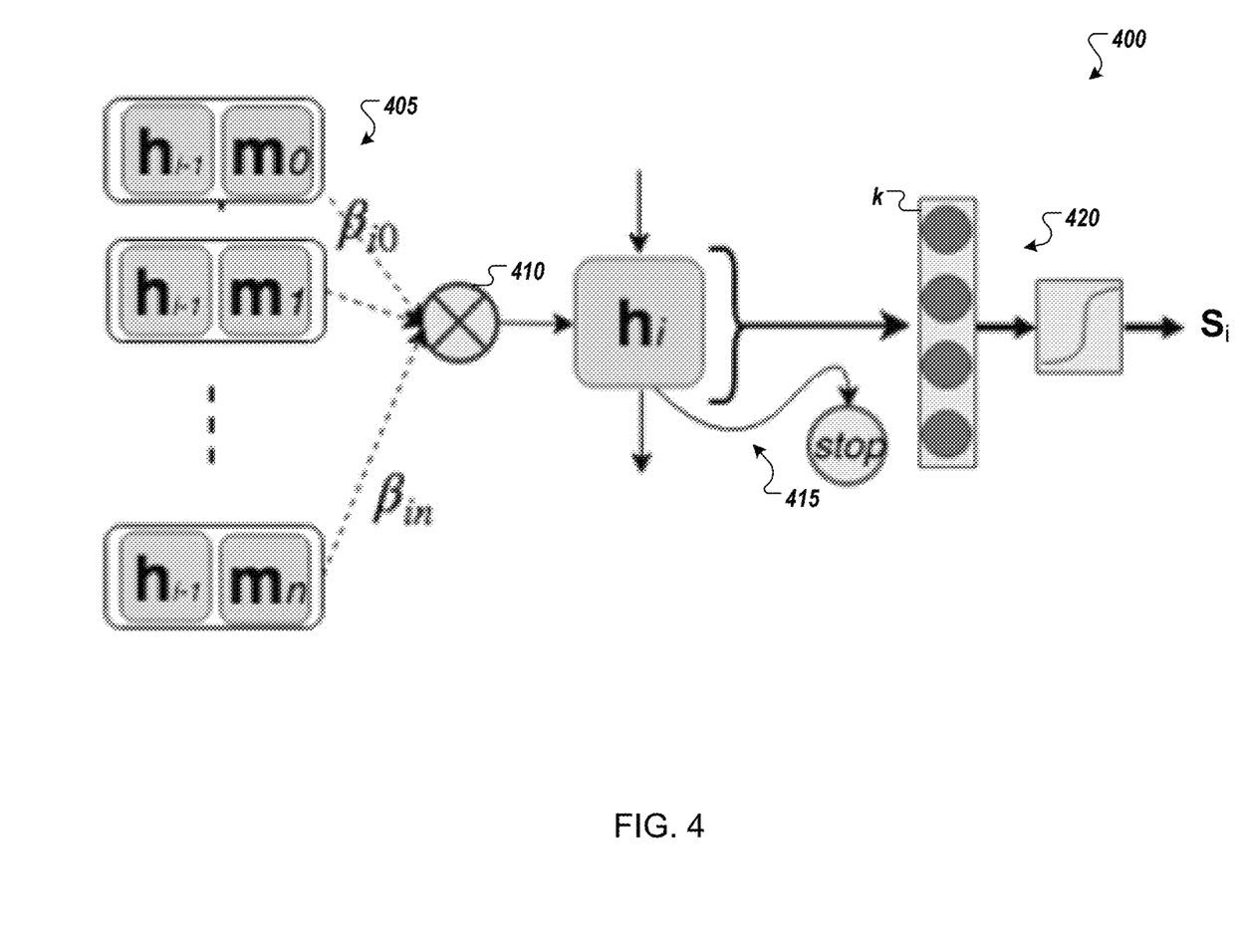
FIG. 4 illustrates a decoder architecture in accordance with example implementations of the present application.

FIG. 4 illustrates a decoder architecture 400 in accordance with example implementations of the present application. The decoded architecture 400 may be used as the decoder 304 in the architecture 300 illustrated in FIG. 3. The architecture 400 may be implemented using one or more neural networks including one or more computing devices such as computing device 805 illustrated in FIG. 8 discussed below. The illustrated decoder architecture 400 is a thread-LSTM. In some example implementations, the thread-to-thread decoder may be a unidirectional LSTM ($f^{Dt2t}$) with its initial state $h_0^{Dt2t}$ set with a feedforward-mapped conversation vector C'. The input to the single layer feedforward is the last state of post-to-post encoder. At any step i of the decoder, a sequence of attention weights, $\langle\beta_{i0}, \ldots, \beta_{in}\rangle$, corresponding to the post representations, $\langle m_0, \ldots, m_n\rangle$, are computed utilizing the previous state, $h_{i-1}^{Dt2t}$:

$$eij = \text{top attn}(h_i^{Dt2t}, mj) \qquad \text{(equation 1)}$$

$$\beta ij = \sigma(eij) \qquad \text{(equation 2)}$$

where top_attn is a single layer feedforward that aligns the previous state $h_{i-1}^{Dt2t}$ to a post representation $m_j$ and a sigmoid over the resulting value computes an attention weight βij using equation 2 above. This is done at 405 of the architecture 400.

At 410 of the architecture, a weighted representation of the posts is then computed using equation 3 below and used as the next input to an LSTM which then uses the previous state and this input to compute the next state $h_i^{Dt2t}$.

$$\frac{1}{n}\sum_{j=1}^{n}\beta_{ij}m_j \qquad \text{(equation 3)}$$

The current state, $h_i^{Dt2ti}$, is passed through a single layer feedforward network and a distribution over STOP=1 and CONTINUE=0 is computed at 415 using equation 4 below.

$$p_i^{STOP} = \sigma(g(h_i^{Dt2t})) \qquad \text{(equation 4)}$$

Where g is a feedforward network. The thread-to-tread decoder keeps decoding until $p_i^{STOP}$ is greater than 0.5.

At 420, the current state, $h_i^{Dt2t}$, is passed through another single layer feedforward network k followed by a tan h activation to compute the threads representation $s_i$ using equation 5 below.

$$s_i = \tan h(k(h_i^{Dt2t})) \qquad \text{(equation 5)}$$

The generated thread representation, $s_i$, may then be feed into a word-to word decode, such as a unidirectional attentional LSTM, to generate a summary for the thread.

In other example implementations, the thread-to-thread decoder $_{may}$ alternatively be a feedback LSTM, with the top-level decoder that is a separate LSTM that runs over the words of the previously generated sentence in order to obtain a feedback signal for a newer topic. The feedback signal may be used to generate non-redundant summaries of the different threads in interleaved text. In some example implementations, the feedback signal may utilize the last hidden state of the low-level decoder that generated the previous sentence. This may removes the overhead of running an extra LSTM, and therefore, speed up the training. Thus, some example implementations may use the last hidden state of the unidirectional word-to-word LSTM that was run on the previously generated summary, i.e. hDw2w i−1, to compute a thread representation. In addition, in some example implementations, the thread-to-thread decoder in FIG. 3 may be removed and instead the thread representations may be computed using a feed-forward network on the last hidden state. Basically, in this decoder the knowledge of threads is supplied using the feedback representation.

Figure 5:
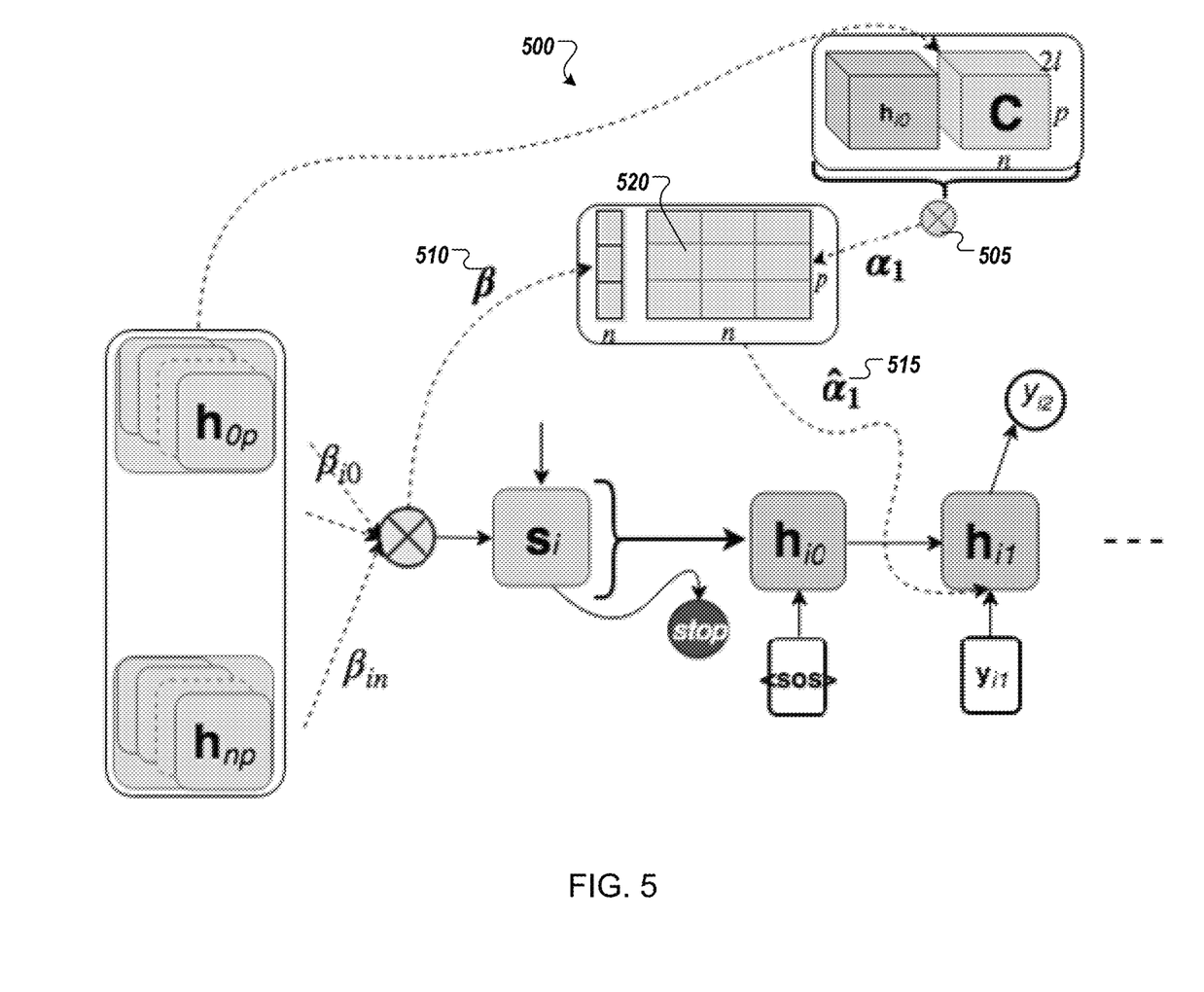
FIG. 5 illustrates an attention architecture in accordance with example implementations of the present application.

FIG. 5 illustrates an attention architecture 500 in accordance with example implementations of the present application. The attention architecture 500 may be used as the in the architecture 300 illustrated in FIG. 3. The architecture 500 may be implemented using one or more neural networks including one or more computing devices such as computing device 805 illustrated in FIG. 8 discussed below.

The illustrated attention architecture 500 is dynamic hierarchical attention is applicable to hierarchical decoding and is indifferent to encoding methodologies. The attention architecture reutilizes the higher level attentions, that are computed while obtaining a thread representation, s, and scales the lower level attentions, α, that are computed while generating a word, y, of a summary, S as illustrated in FIG. 5.

In some example implementations, the attention architecture 500 may be coupled to a hierarchical encoder, attention weights, $\alpha_j$, are computed while decoding each word, $y_j$ at 505. Further, at 510, the post-level attentions, β are used to compute new word level attention weights, $\hat{\alpha}_j$. The new word level attentions, $\hat{\alpha}_j$, may be calculated at 515 using equation 6 below:

$$\hat{\alpha}_{jtk} = \frac{\beta_t \times \exp(e_{jtk})}{\sum_{t=1}^{n}\beta_t \times \left(\sum_{k=1}^{p}\exp(e_{jtk})\right)} \qquad \text{(equation 6)}$$

In equation 6, $e_{jtk}$ is calculated using equation 7 below, where C is a word-to word encoder representation matrix of n×p×2l(520), and attn is a feedforward network that aligns the current word decoder state $h_{j-1}^{Dw2w}$ with all n·p representation vectors in C.

$$e_{jtk} = \text{attn}(h_{j-1}^{Dw2w}, C_{tk}) \qquad \text{(equation 7)}$$

In other example implementations, the attention architecture 500 may be coupled to a sequential encoder. In these embodiments, there is only one encoder, e.g., a word-to-word encoder, and the resulting word representation matrix, C, has a dimension of n×p×2l (520). In Equation 1, the decoder state is aligned to a word representations, w, instead of a thread representation, and therefore, the resulting higher level attentions, β, is of size n·p. The hierarchical attention may use these high-level word attentions, β, for rescaling a low level attention using equation 8:

$$\hat{\alpha}_{jk} = \frac{\beta_k \times \exp(e_{jk})}{\sum_{k=1}^{n \cdot p} \beta_k \times \exp(e_{jk})} \quad \text{(equation 8)}$$

Figure 6:
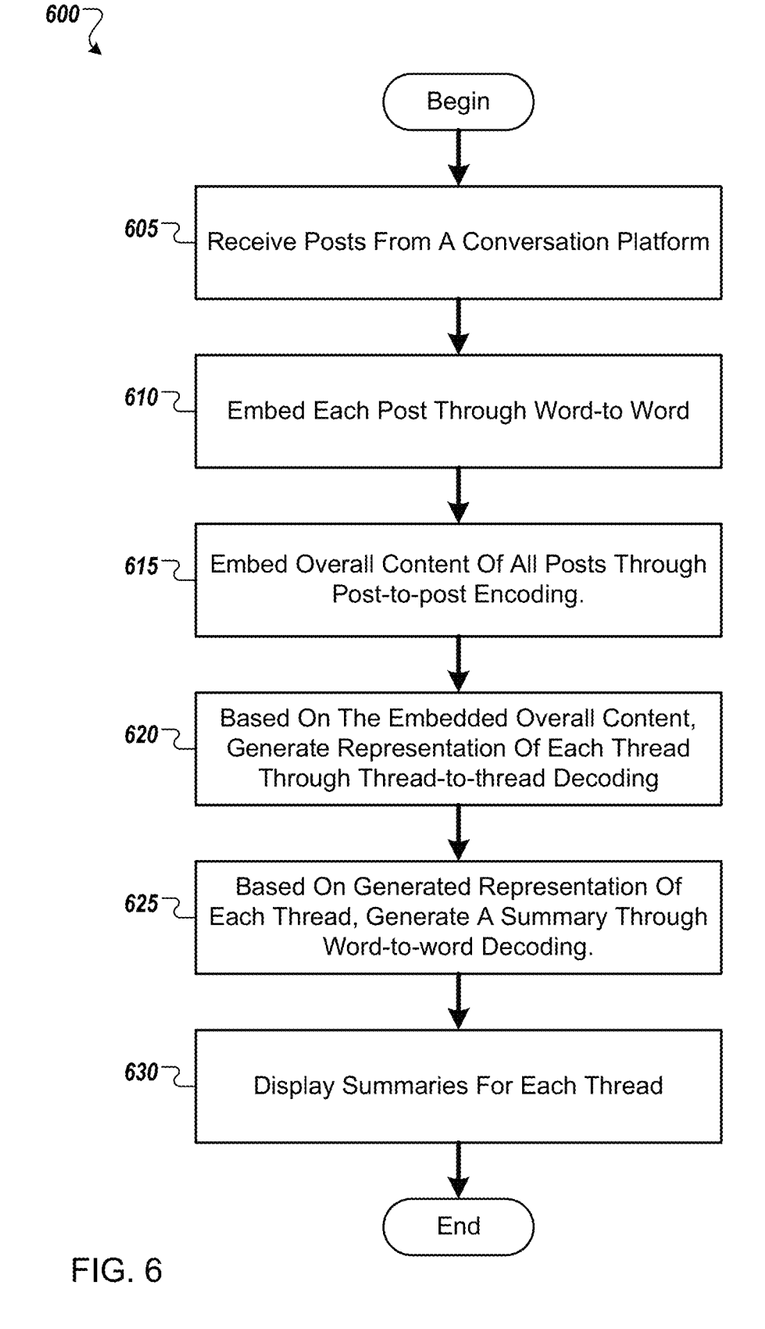
FIG. 6 illustrates a flow chart of a process for generating and displaying summaries of conversation threads from interleaved posts in a conversational platform in accordance with example implementations of the present application.

FIG. 6 illustrates a flow chart of a process 600 for generating and displaying summaries of conversation threads from interleaved posts in a conversational platform in accordance with example implementations of the present application. As illustrated, the process 600 includes first receiving or extracting posts from a conversational platform at 605. The conversational platform is not particularly limited and may include a social media platform, a chat platform, an enterprise group conversation platform, or any other conversational platform that may be apparent to a person of ordinary skill in the art. Further, example implementations of the present application are not limited to summarizing posts and may be applied to other unstructured pieces of text on various topics as may be apparent to a person of ordinary skill in the art.

At 610, each received or extracted post is embedded through word-to-word encoding by a trained neural network. For example, a low-level, word-to-word encoder may convert a sequence of words in the post to a sequence of representations.

Further, at 615, the overcall content and discourse structure of the interleaved texts may be embedded through post-to-post encoding based on the word-to-word encodings of 610 by a trained neural network. For example, the encoded representations of the posts from 610 may be passed to a top-level, post-to-post encoder to convert to a sequence of top-level post representations.

At 620, embedded overall content and discourse may be used to generate representations of each conversational thread through thread-to-thread decoding. For example, the encoded top-level post representations may be passed to a decoder that utilizes a top-level, thread-to-thread decoder to disentangle them into a sequence of thread representations. In some example implementations, this decoding may be done by a threadLSTM as described above with respect to FIG. 4. In other example implementations, this decoding may be done by a feedbackLSTM as also describe above.

At 625, a summary of each conversational thread is generated through word-to-word decoding based on the generated representation of each thread from 620. For example, a low-level, word-to-word decoder may take each thread representation and generate a sequence of summary words.

At 630, the generated summary of each conversational thread may be output to a stored database for review by a user interested in determining the general subjects of ongoing conversations or the generated summary may be displayed adjacent to the analyzed posts in conversational platform and the process 600 may end.

Figure 7:
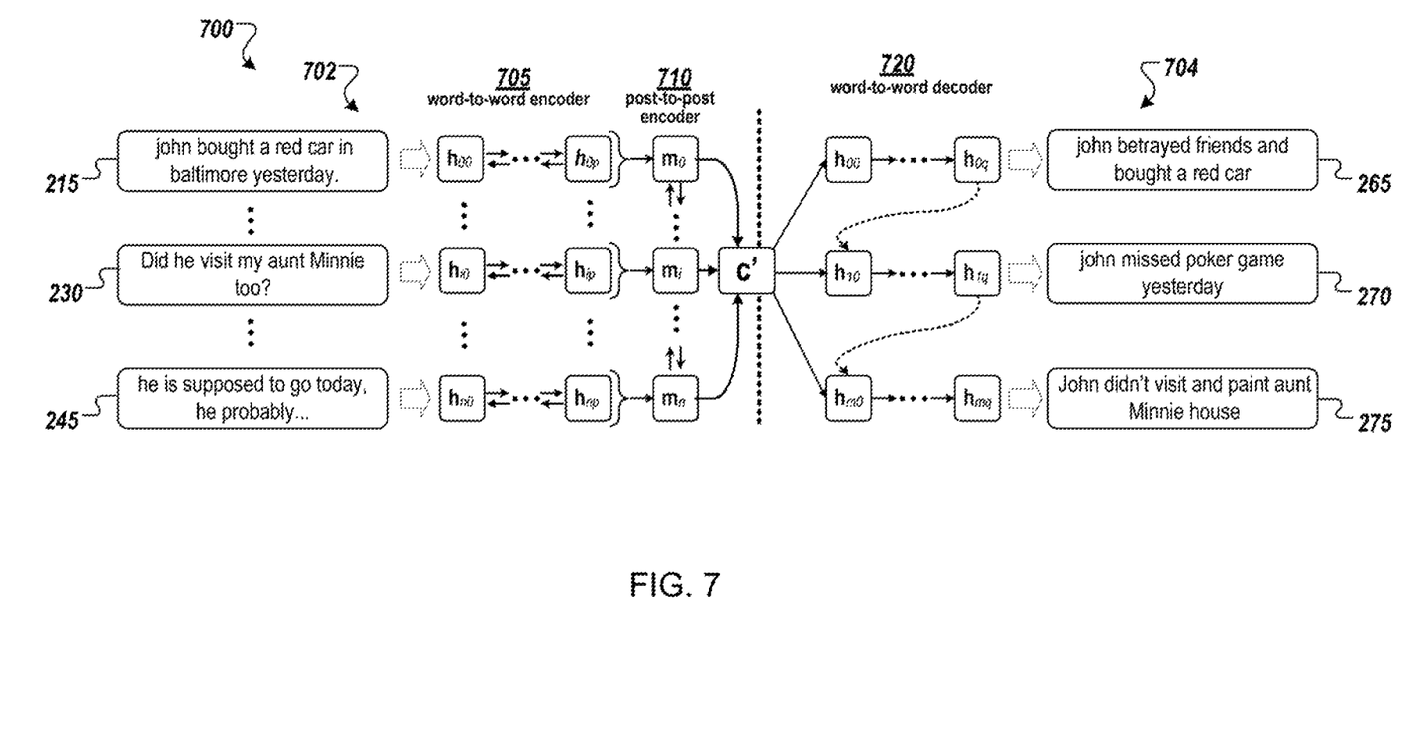
FIG. 7 illustrates a conceptual schematic of a hierarchical encoder-decoder architecture in accordance with other example implementations of the present application.

FIG. 7 illustrates a conceptual schematic of a hierarchical encoder-decoder architecture 700 in accordance with other example implementations of the present application. The architecture may be implemented using one or more neural networks including one or more computing devices such as computing device 805 illustrated in FIG. 8 discussed below. As illustrated, the encoder side 702 of the architecture includes first, a low-level, word-to-word encoder 305 that converts a sequence words in a post, Pj (215-245 from FIG. 2), to a sequence of representations, $Hj=<h_{j0}, \ldots, hj_{|P_j|}>$. Subsequently, a top-level, post-to-post encoder 710 converts those representations, $<H_0, \ldots, H_{|C|}>$ to a sequence of top-level post representations, $<m_1, \ldots, m_{|C|}>$. These encoded representations are then passed to the decoder 704, which utilizes multiple copies of a word-to-word decoder 720, each copy being fed the feedback signal of the previous word-to-word decoder to generate a sequence of summary words (265-275 from FIG. 2).

The maximum number of posts in the interleaved texts is denoted by n and threads by m. In some example implementations, the number of words in posts may be limited and summaries limited to fixed lengths by either truncating or padding, and denote them by p and q respectively. Further, the hidden states of the encoder and decoder may have dimensionality l.

In some example implementations, the word-to-word encoder 705 and the posts-to-post encoder 710 may be Long Short-term Memory (LSTM) Neural Networks. Further, some example implementations may use a feedbackLSTM, which takes feedback from the previous copies low-level decoder to generate a new topic, for the decoder 704.

As discussed below, some example implementations may use hierarchical attention with attentions only being computed when decoding new sentences. Additionally, in some example implementations, the attention networks may be trained end-to-end.

Evaluation Results

Applicants have conducted comparative evaluations using synthetic data set. Applicant first compared a related art, unsupervised, abstractive meeting summarization model (RA Model) to a vanilla seq2seq model. Applicant also compared a vanilla seq2seq models against hier2hier models, as well as on variations where either only the encoder or only the decoder are hierarchical models. Further, applicant also evaluated a hierarchical attention model where an LSTM to model threads is used vs. feeding back the thread representation during decoding.

Data Set Used for Evaluation

A large number of conversations occur every day in social media, (e.g., Reddit, Twitter, or any other social media platform that might be apparent to a person of ordinary skill in the art. However, summaries of those conversations are not available. Therefore, obtaining labeled training data for neural encoder-decoder summarization models can be challenging.

To address this, Applicant's created a synthetic dataset using abstracts from the PUBMED corpus of randomized controlled trials (RCT). Within these abstracts, the sentences are structured into background, objective, method, result, and conclusion, and the title of the article summarizes the information in these subsections. To produce the training data, ordered sentences from a few abstracts were randomly interleaved to form a synthetic text, and the corresponding interleaved titles were used to form a synthetic multi-sentence summary. The parameters for creating the synthetic corpora are illustrated below in Table 1, illustrating three different corpora for experiments were created (EASY, MEDIUM, and HARD).

TABLE 1

Three different corpora for experiments

| Type | min # abstracts | max # abstracts | min # sents | max # sents |
|---|---|---|---|---|
| Easy | 2 | 2 | 5 | 5 |
| Medium | 2 | 3 | 2 | 5 |
| Hard | 2 | 5 | 2 | 5 |

Baseline Comparisons

The performance of the RA model and two seq2seq models are shown for the Easy corpus in Table 2. The RA model is an unsupervised two-step process, where the summarization component is an unsupervised sentence compression technique. Cluster→seq2seq model utilizes the clustering component from the RA model to first cluster the interleaved texts of the corpus, and then the disentangled corpus is used to train a vanilla seq2seq model. As illustrated in Table 2, the seq2seq model clearly, performs better than the unsupervised method in the RA model, because the seq2seq model trained on a sufficiently large dataset is better at summarization than the sentence compression method. Further, the lower performance of cluster→seq2seq model in comparison to the seq2seq model shows not only that a disentanglement component is unnecessary but also illustrates the error propagation from disentanglement to summarization has a negative effect.

TABLE 2

Rouge F1-Scores for seq2seq models on the Easy Corpus.

| Model | Rouge-1 | Rouge-2 | Rouge-L |
|---|---|---|---|
| RA Model | 30.37 | 10.77 | 20.04 |
| seq2seq | 44.38 | 19.47 | 35.20 |
| cluster → seq2seq | 42.93 | 18.76 | 30.68 |

Comparison of seq2seq and hier2heir

Applicants also compared the hierarchical encoder-decoder approaches against the sequence-to-sequence approach in summarizing the interleaved texts by experimenting on the Medium and Hard corpora. Table 3 shows the experimental results. As illustrated, an increase in the complexity of interleaving from the Medium Corpus to the Hard Corpus somewhat reduces the performance of the models, but less for Rouge-1. Table 3 also shows the change in performance with the change of encoder-decoder components starting from seq2seq. A change of encoder from sequentially to hierarchically gave only a minor improvement, but the enhancement in the speed of training (≈2× in a GPU[1]) with this change is very essential, as often a sequential model takes a week to converge. A noticeable improvement is observed on changing the decoder to hierarchical. However, the change of performance due to the type of hierarchical decoding, i.e., threadLSTM or feedbackLSTM, is minor.

[1] TESLA V100

TABLE 3

Rouge F1-Scores of models on the Medium and Hard Corpus. hier2hier_tLSTM refers to hierarchical decoding using threadLSTM and hier2hier_fLSTM refers to hierarchical decoding using feedbackLSTM.

| Model | Rouge-1 | Rouge-2 | Rouge-L |
|---|---|---|---|
| | Medium Corpus | | |
| seq2seq | 38.78 | 16.47 | 30.12 |
| hier2seq | 39.42 | 16.18 | 29.99 |
| hier2hier_tLSTM | 41.33 | 17.10 | 32.14 |
| hier2hier_fLSTM | 40.83 | 17.29 | 31.73 |
| | Hard Corpus | | |
| seq2seq | 38.76 | 15.90 | 28.48 |
| hier2seq | 39.19 | 15.62 | 28.33 |
| hier2hier_tLSTM | 41.21 | 16.30 | 30.13 |
| hier2hier_fLSTM | 41.76 | 16.89 | 30.70 |

Effect of Hierarchical Attention

To illustrate the impact of hierarchical attention, $\beta$, on the hierarchical decoders, Applicant performed an ablation study of top-level attentions, and used the Hard corpus for the experiments. The contribution of the top-level attentions in a hierarchical decoder is two-fold: computing the thread representation and rescaling the word-level attentions. Table 4 shows the performance comparison. The models with hierarchical attention have enhanced performance compared to ones without; however, the relative enhancement in the case of the hierarchical encoders is higher than for the sequential ones as the hierarchical encoders more appropriately integrate the hierarchical arrangement of information.

TABLE 4

Rouge F1-Score of models on the Hard Corpus.
tLSTM refers to threadLSTM, fLSTM to feedbackLSTM and HAttn to hierarchical attention.
In Sequential Encoder, *LSTM refers to seq2hier_*LSTM.
In Hierachical Encoder, *LSTM refers to hier2hier_*LSTM.

| Model | HAttn. | Rouge-1 | Rouge-2 | Rouge-L |
|---|---|---|---|---|
| | Sequential Encoder | | | |
| tLSTM | No | 39.67 | 15.32 | 29.00 |
| | Yes | 40.83 | 15.98 | 29.81 |
| fLSTM | No | 39.11 | 15.11 | 29.12 |
| | Yes | 40.11 | 15.59 | 29380 |
| | Hierarchical Encoder | | | |
| tLSTM | No | 38.49 | 14.76 | 28.63 |
| | Yes | 41.21 | 16.3 | 30.13 |
| fLSTM | No | 38.45 | 14.77 | 28.21 |
| | Yes | 41.76 | 16.89 | 30.70 |

Example Computing Environment

Figure 8:
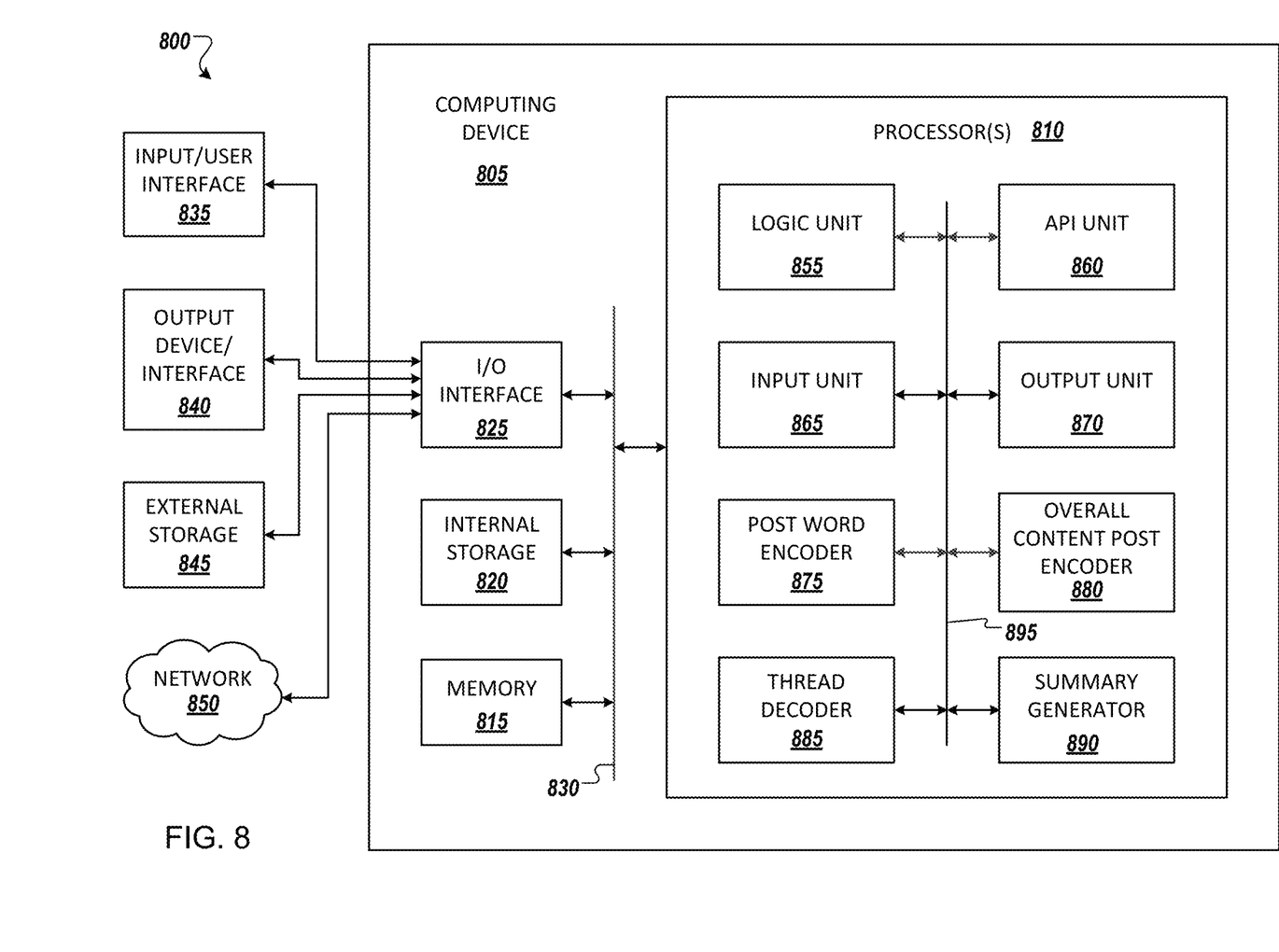
FIG. 8 illustrates an example computing environment with an example computer device suitable for use in some example implementations of the present application.

FIG. 8 illustrates an example computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/interface 835 and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805. These elements may include, but are not limited to, well-known AR hardware inputs so as to permit a user to interact with an AR environment.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, post word encoder unit 875, overall content post encoder 880, thread decoder 885, summary generator 890 and inter-unit communication mechanism 895 for the different units to communicate with each other, with the OS, and with other applications (not shown).

For example post word encoder unit 875, overall content post encoder 880, thread decoder 885, and summary generator 890 may implement one or more processes shown in FIG. 6 and implement the architectures of FIGS. 3-5. The described units and elements can be varied in design, function, configuration, or implementation and are not limited to the descriptions provided.

In some example implementations, when information or an execution instruction is received by API unit 860, it may be communicated to one or more other units (e.g., post word encoder unit 875, overall content post encoder 880, thread decoder 885, and summary generator 890). For example, post word encoder unit 875 may perform word-to-word encoding to embed each post extracted from an interleaved conversation platform. Further, the overall content post encoder 880 may receive embedded posts and perform post-to-post encoding to embed the overall content to represent the discourse structure of the interleaved conversation platform. Further, the thread decoder 885 may generate representation of one or more thread decoded from the embedded overall content. Further, the summary generator 890 may perform word-to-word decoding to generate sentence summaries of each thread based on the generated thread representations.

In some instances, the logic unit 855 may be configured to control the information flow among the units and direct the services provided by API unit 860, input unit 865, post word encoder unit 875, overall content post encoder 880, thread decoder 885, and summary generator 890 in some example implementations described above. For example, the flow of one or more processes or implementations may be controlled by logic unit 855 alone or in conjunction with API unit 860.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of automatically summarizing posts of interleaved text, the method comprising:
    receiving a plurality of posts of interleaved text;
    embedding, by a first neural network, each post through word-to-word encoding;
    embedding, by a second neural network, overall content of the plurality of posts through post-to-post encoding based on the word-to-word encoding of each post;
    generating, by at least a third neural network, a summary of the at least one thread through word-to-word decoding based on the overall content embedding of the plurality of posts; and
    displaying the summary of the at least one thread to a user.

2. The method of claim 1, wherein generating a summary of at least one thread comprises generating, by an attention neural network trained end-to-end using regularly labeled data, a post-level attention to generate words in a sentence of the summary.

3. The method of claim 2, wherein the generating a post-level attention is performed only when decoding new sentences in the thread-to-thread decoding.

4. The method of claim 2, wherein generating a summary of at least one thread further comprises additionally generating, a word-level attention to generate words in a sentence of the summary.

5. The method of claim 1, wherein the generating a summary of the at least one thread through word-to-word decoding based on the overall content embedding of the plurality of posts comprises:
  generating, by the third neural network, a representation of at least one thread through thread-to-thread decoding based on the overall content embedding of the plurality of posts;
  generating, by a fourth neural network, a summary of the at least one thread through word-to-word decoding based on the generated representation of the at least one thread;
  wherein the third neural network is a unidirectional Long Short Term Memory Neural Network that generates the representations of the threads.

6. The method of claim 5, wherein the third neural network passes a current state through a single layer feed-forward network followed by a tan h activation to compute the at least one thread representation.

7. The method of claim 1, wherein the third neural network is a Neural Network that processes the words of a previously generated summary in order to obtain a feedback signal for a new topic for a summary.

8. The method of claim 7, wherein the third neural network is a unidirectional word-to-word LSTM that was run on the previous generated summary.

9. A non-transitory computer readable medium encoded with instructions for making a computing device execute a method of automatically summarizing posts of interleaved text, the method comprising:
  receiving a plurality of interleaved text;
  embedding, by a first neural network, each post through word-to-word encoding;
  embedding, by a second neural network, overall content of the plurality of posts through post-to-post encoding based on the word-to-word encoding of each post;
  generating, by at least a third neural network, a summary of the at least one thread through word-to-word decoding based on the overall content embedding of the plurality of posts; and
  displaying the summary of the at least one thread to a user.

10. The non-transitory computer readable medium of claim 9, wherein generating a summary of at least one thread comprises generating, by an attention neural network trained end-to-end using regularly labeled data, a post-level attention to generate words in a sentence of the summary.

11. The non-transitory computer readable medium of claim 9, wherein the generating a summary of the at least one thread through word-to-word decoding based on the overall content embedding of the plurality of posts comprises:
  generating, by the third neural network, a representation of at least one thread through thread-to-thread decoding based on the overall content embedding of the plurality of posts;
  generating, by a fourth neural network, a summary of the at least one thread through word-to-word decoding based on the generated representation of the at least one thread;
  wherein the third neural network is a unidirectional Long Short Term Memory Neural Network that generates the representations of the threads.

12. The non-transitory computer readable medium of claim 11, wherein the third neural network passes a current state through a single layer feed-forward network followed by a tan h activation to compute the at least one thread representation.

13. The non-transitory computer readable medium of claim 9, wherein the third neural network is a Neural Network that processes the words of a previously generated summary in order to obtain a feedback signal for a new topic for a summary.

14. The non-transitory computer readable medium of claim 13, wherein third neural network is a unidirectional word-to-word LSTM that was run on the previous generated summary.

15. A computing device comprising:
  a storage device storing a plurality of posts of interleaved text; and
  a processor encoded to execute a method of automatically summarizing the posts of interleaved text, the method comprising:
  extracting the plurality of posts from the storage device;
  embedding, by a first neural network, each post through word-to-word encoding;
  embedding, by a second neural network, overall content of the plurality of posts through post-to-post encoding based on the word-to-word encoding of each post;
  generating, by at least a third neural network, a summary of the at least one thread through word-to-word decoding based on the overall content embedding of the plurality of posts; and
  displaying the summary of the at least one thread to a user.

16. The computing device of claim 15, wherein generating a summary of at least one thread comprises generating, by an attention neural network trained end-to-end using regularly labeled data, a post-level attention to generate words in a sentence of the summary; and
  wherein the generating a post-level attention is performed only when decoding new sentences in the thread-to-thread decoding.

17. The computing device of claim 15, wherein the generating a summary of the at least one thread through word-to-word decoding based on the overall content embedding of the plurality of posts comprises:
  generating, by the third neural network, a representation of at least one thread through thread-to-thread decoding based on the overall content embedding of the plurality of posts;
  generating, by a fourth neural network, a summary of the at least one thread through word-to-word decoding based on the generated representation of the at least one thread;
  wherein the third neural network is a unidirectional Long Short Term Memory Neural Network that generates the representations of the threads.

18. The computing device of claim 17, wherein the third neural network passes a current state through a single layer feed-forward network followed by a tan h activation to compute the at least one thread representation.

19. The computing device of claim 15, wherein the third neural network is a Neural Network that processes the words of a previously generated summary in order to obtain a feedback signal for a new topic for a summary.

20. The computing device of claim 19, wherein the third neural network is a unidirectional word-to-word LSTM that was run on the previous generated summary.

* * * * *